3,440,175
CONTINUOUS PROCESS FOR MAKING
SILICA SOLS
Helmut H. Weldes, 9 Ellis Road, Havertown, Pa. 19083;
Francis A. Boyle, 125 Henderson Ave., Norwood, Pa.
19074; and John S. Stephen Bobb, 3254 Friendship St.,
Philadelphia, Pa. 19149
Filed Oct. 22, 1965, Ser. No. 501,411
Int. Cl. C01b 33/14; B01j 13/00
U.S. Cl. 252—313                                      7 Claims

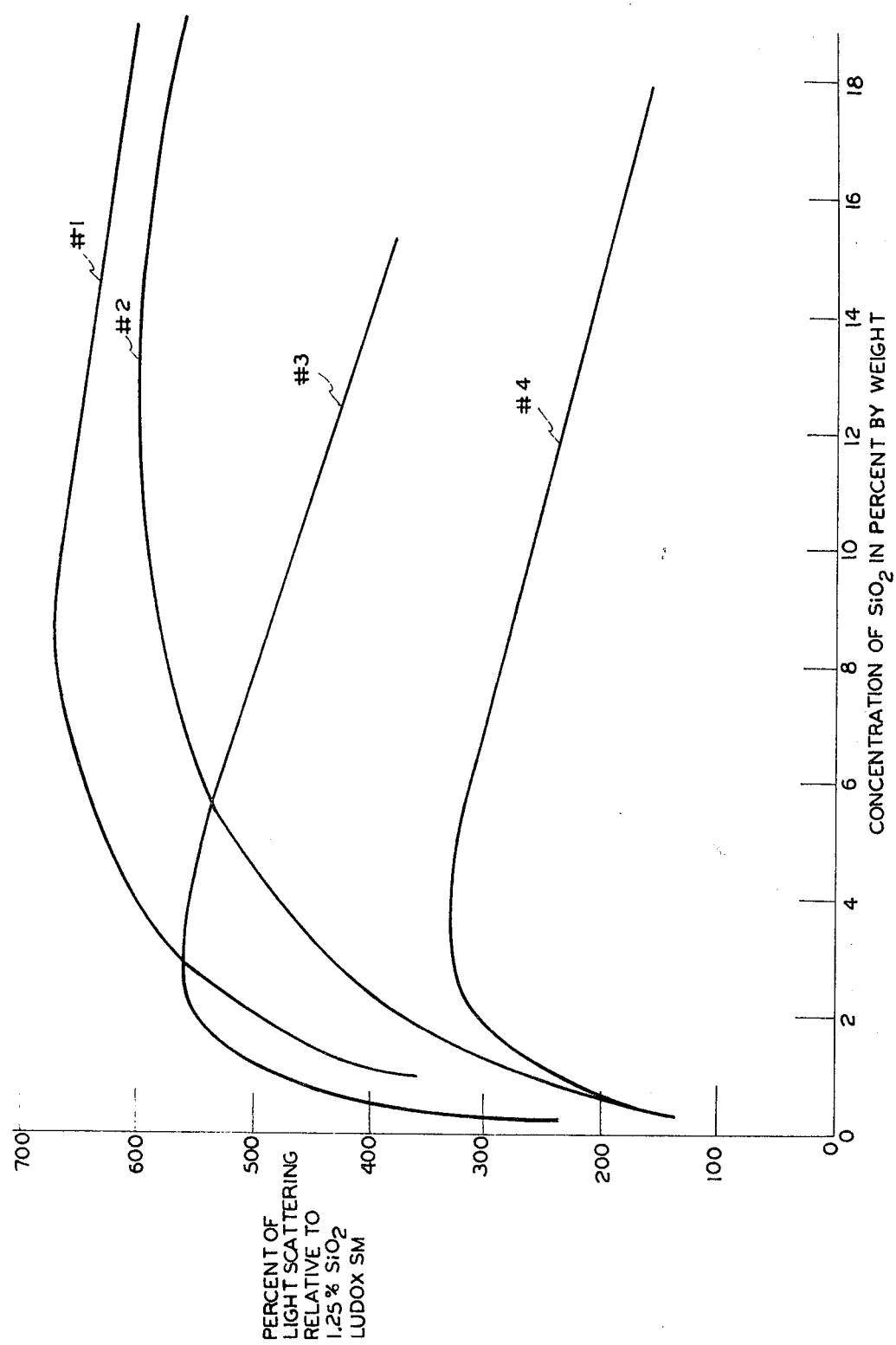

ABSTRACT OF THE DISCLOSURE

This is a process for forming a condensed silica sol without first forming a heel and said new condensed sol has a much reduced proportion of occluded alkali metal ions.

---

As an improvement in the art of preparing silica sols characterized by dense colloidal particles from soluble silicates we have invented a continuous process of manufacture from a acid nascent sol wherein the ratio of occluded stabilizing ions in the final converted sol is low and the mean average particle size is sufficiently close to the average particle size that stable silica sols of 50% or more concentration can be made having higher conductivities and lower total stabilizing ion content than previously considered possible. This is accomplished by controlling the pH within narrow limits during the conversion and stabilization of the initial acid nascent sol to an alkaline silica sol free from tendency to gel.

By "nascent sol" we mean an alkali metal silicate solution from which the cations have been removed as by exchange with hydrogen, said solution containing silica in the subcolloidal size range or in the border region such that the $SiO_2$ is either non-polymerized or is polymerized only to form particles with an average diameter less than about 5 m$\mu$. These nascent sols may be either acid or alkaline depending on the ratio of $SiO_2$ to free alkali metal ions. By free alkali metal ions we mean those which have not been occluded by polymerization of the silica.

A stable sol is one which is substantially free from the tendency to gel on standing at ambient temperatures in a closed metal container, for a period of at least six months, and preferably for as long as two years.

Prior art

The art on silica sols and their preparation is full and complex. We especially suggest the following patents as having a bearing on the field of our invention: Bechtold & Snyder, 2,574,902; Rule, 2,577,484 and 2,577,485; Bird, 2,244,325; Reven & Blake, 3,128,251; Reuter & Tozydlo, Re. 25,252; Marshall, 2,515,960, and 2,515,961; Marcheguet & Gandon 3,026,267.

Advantages and objects

Our primary objective is to develop an economical, continuous process for the preparation of dense polymerized silica sols having a concentration of $SiO_2$ in the neighborhood of 50% and having a stability which will permit widespread industrial use. Another objective is to form such sols with a very low proportion of sodium occluded in the silica sol particles. A still further objective is to form with economy such sols having a conductivity lower than the ordinary commercial sols now available. Another objective is the preparation of silica sols with a minimal total alkali content which is required in certain industrial processes. Another objective is the use of a process with simultaneous conversion or alkalization of the acid nascent sol and polymerization of the dense silica particles in a defined narrow particle size range. A still further objective is the use in this process of acid nascent sols formed either from the ordinary base exchange method or by a new method involving the precipitation of sodium binoxalate monohydrate from solutions of sodium silicate.

Our invention

In the continuous process which we have invented we start with an acid nascent sol having a low molecular weight in which the particles may even be monomeric. This acid nascent sol may be formed either by the usual base exchange processes now common in industry or by removing the alkali, e.g. sodium, from a sodium silicate by the precipitation of the monohydrate of the monosodium salt of oxalic acid or the precipitation and separation of other sodium salts.

Our continuous process is characterized by starting with an alkaline solution at a stated pH in the range of about 8.5 to 11.0, but preferably between 9 and 10, which solution may contain no silica at all or merely that which results from using an alkali silicate solution diluted to the desired pH. This pH is maintained and controlled within narrow limits of ±0.2 unit as the acid nascent sol is added to the original alkaline solution at a temperature usually above about 60° C. and preferably near or at the boiling point of the solution. We thus are able to produce our sols without the formation of a heel or the alkalization of the acid nascent sol at ambient temperatures.

We have found that the size of the final silica particles, the stability, and concentration of the sol may be defined be controlling the pH, temperature, agitation and concentration of $SiO_2$ in desired ranges which may be varied during the conversion. We may, for instance, carry out the complete conversion and concentration at one pH (e.g., 9.2) or we may start at one pH and slide up or down to another pH according to the characteristics desired in the final sol. A slide up is called an "alkaline quench" while a slide down is an "acid quench."

The pH is controlled by additional dilute alkali as required by the added acid nascent sol. The whole process may be carried out at constant volume if desired.

Our process has the advantage of producing rather distinctly different densified silica sols by relatively simple processing changes, a very valuable advantage of our narrow control of pH during the conversion. For instance, a sol with a large particle size and a high ratio of $SiO_2$ to $Na_2O$ may be produced by first running the conversion at a pH controlled at about 9.7 to produce more rapidly a larger particle size and then sliding the pH down to a value controlled at about 9.2 to increase the ratio. Sols with larger particle sizes may be produced by running the conversion [at, for instance, pH of 9.7] for a longer period before sliding the pH down. A sol with a smaller particle size and a higher ratio may be produced by employing an acid nascent sol of a lower silica content, preferably at a like basic pH (about 9.7) and concentrating at the particle size desired. Alternatively, the first part of the conversion may be controlled at 9.5 instead of 9.7 before sliding the pH down and controlling it at about 9.2 and indeed the conversion may be controlled at a constant pH, e.g. 9.2, but we consider that the best method of producing the smaller particle size sols with a high $SiO_2/Na_2O$ ratio is to control the initial conversion at a pH of 9.7 for only a short time and then to slide down and control the pH at 9.2. This should produce the desired particle size in the least time. To produce sols of large particle size and low ratio, the order of conversion may be reversed with the initial conversion controlled at 9.2 and then sliding up and controlling the pH at 9.7 for the final stages. These developments are based on a careful evaluation of particle growth with the addition of acid nascent sol.

The particle size obtained depends on the pH, temperature, the silica concentration and rate of addition of the acid nascent sol and the concentration of the conversion sol. When the acid nascent sol contained 4.1% of $SiO_2$ a particle size of 17 m$\mu$ was obtained. With an acid nascent sol at 4.7% $SiO_2$ with other conditions unchanged, the particle size was 21 m$\mu$, and with 5.5% $SiO_2$ in the acid nascent sol a final sol with a particle size of 23 m$\mu$ was obtained even though the same amount of silica was converted over about the same time period.

It is generally recognized that the most stable sols are those with a high ratio of $SiO_2$ to $Na_2O$, a large particle size and few impurities. It is thus evident that our sols may have properties which lead to long stability.

In the production of silica sols with even larger particle sizes and higher ratios, wherein the particle size itself may be the main stabilizing element, the acid nascent sol may be converted and developed to a sol with large particles of 20 m$\mu$ or more. This sol may be then reconverted to an acid sol by a cation-exchange resin and the acid sol with the large particle size again converted to the alkaline region, as before, resulting in an alkaline sol with very large particles and very high silica/$Na_2O$ ratios. Naturally, this process could be repeated as often as desired.

Our silica sols have been shown by measurement of relative viscosity and by light scattering curves to have a very narrow dispersion of particle sizes. This means that by our careful control of pH and other factors affecting the polymerization of silica during conversion and stabilization, there are relatively few silica particles having diameters much less or much more than the average diameter. This is shown by the rather sharp drop from the maximum in the light scattering curves as the concentration increases above about 2 to 6% $SiO_2$—see J. Am. Chem. Soc. 70, 3985 (1948). On the other hand, other commercial sols reach a maximum and thereafter drop little if at all up to the maximum concentration obtainable, showing that the majority of particles vary widely from the average determined.

The drawing shows representative scattering curves for commercial sols, #1 at 22 m$\mu$ and #2 at 15 m$\mu$ average particle size from different manufacturers over a range of concentration compared with representative curves #3 and #4 prepared by our controlled pH process. Curve #3 represents our acid quench in which the pH was held at 9.7 and shifted to 9.2. Curve #4 represents a continuous conversion at pH 9.3±0.1. The average particle size for sol of curve #3 was 32 m$\mu$ and for sol of curve #4 17 m$\mu$.

Furthermore, relative viscosity measurements show that our particles have a more regular spherical shape than other commercial silica in silica sols since they have relative viscosity measurements below about 1.20 whereas others are distinctly above 1.20. A sol with absolutely spherical particles should have a relative viscosity of 1.14 [J. Mooney, J. Coll. Sci. 6, 162–179 (1951)].

The base exchange process

In forming a silica sol, one may start with sodium silicate or, of course, any equivalent soluble silicate, such as that of potassium, lithium or even organic cations. The ratio of silica to alkali is of little importance except as the alkali may affect the base exchange resin. It is therefore usual to use the most economical form of sodium silicate which is that having a ratio of approximately 3.2 $SiO_2$ to 1 $Na_2O$. The removal of the sodium as described below results in a nascent sol having a silica content usually between about 2 and 6%, a pH of from 2 to 3, an $SiO_2/Na_2O$ ratio between 2000 and 3000, and particles which may be monomeric but at least are of very low molecular weight, and an average diameter of less than about 5 millimicrons.

The preparation of these nascent sols using cation exchange resins such as Amberlite IR-120 from Rohm & Haas Co., Duolite C-25 from Diamond Alkali Co., or Dowex 50 from Dow Chemical Co., in the hydrogen form is well known in the art. By slurrying the resin with the commercial 3.22 sodium silicate and filtration to remove the resin after treatment, a nascent sol with about 5.4% silica is obtained. This has a stability of about 5 hours at room temperature and much longer if cooled. With column operation, a 3% silica nascent sol with a stability of about one week at room temperature is usually obtained but a continuous operation is more readily performed.

A nascent sol at an acid pH suitable for use in our invention may also be prepared by the precipitation of sodium binoxalate monohydrate. Briefly, a diluted sodium silicate may be added slowly with vigorous agitation to a solution of oxalic acid. We have found that addition of solid oxalic acid is necessary for satisfactory removal of sodium. A white, crystalline precipitate of sodium binoxalate monohydrate is formed which may be readily filtered from the remaining silica nascent sol. Additional sodium binoxalate may be removed by diluting with isopropanol or an equivalent solvent and by cooling. Nascent sols containing as much as 7.5% silica at a pH of 1.8 are easily prepared in this way. The pH may be raised from about 1.8 up to about 3.8 by treatment with an anion exchange resin, and the nascent sol may be stable for several days if refrigerated.

Conversion and stabilization

Our continuous process proceeds from an acid nascent sol, such as described above. Continuous conversion is a critical operation and is successful only under conditions of concentration, temperature and pH control which have been carefully worked out. In our process a finite amount of water is made alkaline to a pH of about 10.0 by the addition of sodium hydroxide or other alkali such as sodium silicate. This alkaline solution is heated to 80–100° C., but preferably approximately boiling, and then acid nascent sol is added to the solution and the pH continuously and carefully adjusted by the simultaneous addition of dilute alkali, for instance in the form of a dilute sodium hydroxide solution or dilute sodium silicate solution, and the temperature is maintained at about 80–100° C. or preferably at about the boiling point. The solution is continually agitated. If lower temperatures than the boiling point should be used, longer times would need to be allowed to reach the proper condition.

If a high ratio is desired in the shortest production time, the pH is controlled initially at a higher point, e.g. 9.7, and when the desired particle size is nearly attained the flow rate of the added alkali is decreased or stopped and the pH lowered, e.g. to about 9.2, and the conversion is then continued with pH controlled at the lower range. The addition of the acid nascent sol may be continued to any volume desired and stabilized sol may be continuously removed as new acid nascent sol and alkali are added. The particle size will be determined by the amount and concentration of the nascent sol added, the concentration reached during conversion and to some extent the pH conditions.

It is well known that above a pH of 13.6 the silicate ion corresponds to the monomer and is quite stable. Between a pH of 13.6 and 10.9 the disilicate monomer appears to be the principal anion. Below a pH of 10.9, higher molecular weight aggregates of silica are formed. Initially we had thought that the larger polymers would appear at a pH of about 8.5, and initially too we had expected to carry out the conversion at about a pH of 8.5 and to slide the pH up to 9.2 in order to stabilize the final sol. However, we found that the larger particles formed more rapidly in the early part of conversion at a pH of about 9.7 but if the entire conversion was carried out in the pH range about 9.7 the $SiO_2/Na_2O$ ratio tended to be reduced. Therefore we found that it was advisable to prepare the the sol initially at about 9.7 and then to slide the pH down to about 9.2 after the proper particle size had been reached.

At a constant volume of acid nascent sol of about 6000 parts by volume and a pH of about 9.7, the particle size by light scattering was found to be about 24 m$\mu$ whereas at a pH of 9.2 the particle size was below 20 and usually about 15. However, when particles had been first formed at 9.7, the particle size of the final sol was not reduced by lowering the pH to 9.2 during the conversion.

The conversion sol gradually increases in concentration as nascent sol is added, and if little or no evaporation occurs, will approach the concentration of the acid nascent sol. The acid nascent sol may vary from about 2 to about 10% $SiO_2$. At first the average particle sizes are small but as the concentration approaches 5.0 to 5.5% $SiO_2$ the average diameter will approach about 25 to 30 m$\mu$. In general, conditions are so chosen as to promote polymerization or condensation of the added nascent silica and avoid gelation effects which reduce the density of the particles and promote occlusion of alkali ions. Thus the desired rate of addition of the acid nascent sol will vary with the temperature, the concentration of the nascent sol and the conversion sol and the agitation of the system. In general we prefer to vary the rate from about 5 p.b.v. per minute to about 50 p.b.v. per minute.

Concentration of the alkaline sol

The sol may be concentrated in situ or removed and concentrated without much change in particle size. Fresh nascent sol up to the desired $SiO_2$ concentration may be added during the concentration, at constant volume if desired, and alkali solution added simultaneously to control the pH.

The converted sol removed may be concentrated, if necessary, either by vacuum distillation or by boiling at atmospheric pressure. Using vacuum distillation with a sol boiling at a temperature of about 30° C., the pH tends to drop and decrease sol stability, but this may be overcome by adjusting the pH to the proper range. At atmospheric pressure, more occluded alkali is released from the sol particles since high temperatures promote polymerization and the pH drop is therefore less.

It was also noted that when concentrating with diminishing volume there was approximately a 3% increase in particle diameter. However, with concentration at constant volume, with the continuous addition of sol, additional particle growth did not occur.

By these procedures we produced sols with concentrations of over 50% silica and particle diameters of above 20 m$\mu$.

Theory of particle control

As we have stated before, in our process we start with a solution of dilute alkali to which we continuously add fresh acid nascent sol and the overall particle size is continuously increased to a size controlled by the concentration of $SiO_2$ and the rate of addition of the $SiO_2$ in the acid nascent sol and in the initial stages by the pH of the converting sol which, in turn, is controlled by the balance of alkali (e.g. NaOH or sodium silicate) being added simultaneously with the acid nascent sol.

In the prior art it is assumed that to obtain a particle of dense silica with a size of 15 millimicrons or greater it is necessary to heat an alkaline nascent sol to form a heel of dense seed particles and then to add fresh nascent sol of lower particle size which will add on to the initial dense particles and build up the densified silica particles to the required size. We have found however, that any sol in the $SiO_2$ to $Na_2O$ ratio range of 60 to 130 (determined by volumetric titration) will release alkali when heated in the range of 60° C. to the boiling point. The alkali concentration builds up to a pH of 9.6, or higher, and this precludes the development of particle sizes greater than about 15 m$\mu$. Heating such a sol without the addition of fresh acid nascent sol never increases the particle size to as much as 15 m$\mu$; the particles always remain much smaller. This limitation in particle size in this procedure is caused by alkalization of the nascent sol at room temperature.

On the other hand, if an acid nascent sol with monomeric or similar small particles is heated, the pH will rise slowly into the gelation range and eventually the many fine particles less than 5 millimicrons in size will form a gel. It is thus not possible to form a stabilized sol of dense silica particles at high concentration without converting the sol to the alkaline side.

A more theoretical explanation of gelation in acid sols relies on the equations:

(a) $SiO^-Na^+ + H^+ \rightarrow SiOH + Na^+$
(b) $SiO^- + SiOH \rightarrow SiOSi + OH^-$ Equation (a) describes the reaction leading to polymerization and the production of dense sol particles. Equation (b) describes the reaction leading to gelation. In an acid solution, Equation (b) is favored because of course the OH ion is removed by formation of water and the conditions do not favor the growth of sol particles in an aqueous solution.

In our process, as we have pointed out, we start with a dilute solution of hot alkali (e.g. NaOH or sodium silicate) preferably at approximately the boiling point. To this hot alkali solution we continuously add fresh acid nascent sol. This, of course, tends to lower the pH and we control the pH by adding additional alkali to maintain the pH in the range in which we have found that the particles increase in size most rapidly at low concentrations, that is a pH about 9.6–9.9 and, preferably, 9.7±0.2.

We find that the particles are densified at the same time as the particle size increases, and the final particle size is controlled initially by the pH at which the conversion occurs, by the maximum concentration at which conversion occurs, and by the rate of addition and concentration of the nascent sol. We therefore prefer to reduce the pH after initial particle size growth to avoid adding alkali. In this way, adding acid nascent sols in which the $$SiO_2:Na_2O$$

ratio may be above about 2,000 to alkaline solutions and simultaneously adding the required amounts of alkali to maintain the pH, we are able to obtain final sols having flame ratios much above 150 and titration ratios above 300 with particle sizes above about 25 or 30 m$\mu$. The titration ratio or volumetric ratio is the $SiO_2:Na_2O$ ratio found when $Na_2O$ is determined as the alkali content using the method of volumetric titration with an acid. The flame ratio or spectrophotometric ratio is the ratio of $SiO_2$ to $Na_2O$ found when the $Na_2O$ content is determined using a flame spectrophotometer. The titration method is described in more detail in the section "Characterization of Sols."

Since the particle size does not increase rapidly above a particle size of about 25, we may concentrate our sol as desired, maintaining the ratio of $SiO_2$ to $Na_2O$ at a high level by maintaining the pH at about 9.2 even with the addition of more acid nascent sol.

In addition, we have two important advantages not achieved by the other processes. In the first place, as shown by a comparison of the light scattering curves and the relative viscosity data of our sols, we find that the concentration of particles in the average size range is much greater. In other words, a much larger proportion of the particles are much closer to the average particle size than in previous methods of preparation. Furthermore, we have the very important advantage that the alkali which is present in our sols is not trapped or occluded in the particles, or rather the amount which is trapped is very much less than is found in previous methods at the same particle size and concentration. The amount of alkali which is occluded, or trapped, may be determined by comparing the alkali which may be titrated with acid (that is, the volumetric $Na_2O$ method described in previous patents) with the total amount of alkali present as determined by flame spectrophotometry. The procedure in this latter method depolymerizes the silica particles and releases any occluded $Na_2O$ and thus makes it available for the analytical determination. A more rigorous test for occluded alkali is to remove the free alkali cations completely from the sols by passing through a cation exchange resin and to then determine the remaining alkali by flame spectrophotometry. Our sols are thus much more free of alkali which is an important characteristic in many commercial applications. Applications such as the production of organic ammonium silicates for use as core binders, where the very minimum of alkali may be tolerated, require such sols.

Relative viscosity and light scattering data indicate that the particles formed in our sols have a very uniform shape. Because of the low alkali content necessary for stabilization of our larger particle size sols, the conductivity of our sols is lower than that of the usual sol of similar concentration and cost. We believe these advantages result from the continuous addition of fresh, active silica under constant conditions permitting the particles to grow slowly and regularly by polymerization without substantial agglomeration.

It is possible to prepare sols by our method in which the particle size itself is the main stabilizing element.

Characterization of sols

Silica sols are classified and categorized by the size and shape of the particles, the concentration of the silica, the viscosity, the pH, the ratio of $SiO_2$ to $Na_2O$, and the Na or stabilizing ion content. The titratable or volumetric $SiO_2/Na_2O$ is determined by titrating with acid, e.g. HCl, to an end point of pH 4 which determines the $Na_2O$ content which is not occluded. Additional $Na_2O$ may be blocked or trapped within the sol particles or sodium may be present in the form of neutral salts. The titratable alkali plus the salts determine the conductivity of the sol, and this figure is also sometimes reported. Total silica is determined gravimetrically by the usual methods.

The total alkali ion content may be determined spectrophotometrically. The flame spectrophotometer is usually employed.

The particle size may be measured by the light scattering of dilute solutions of the sol. There is also a method of determining the surface area and particle size by alkali titration, as well as by electron microscope observation. These methods agree very well when properly controlled.

The determination of particle size by light scattering depends on the development of a standard curve based on the scattering by particles of a known size. In our comparison we have used the silica sol, LUDOX SM, sold by du Pont de Nemours & Co. and having a particle size range of 7 to 9 m$\mu$. In order to better evaluate the method, we have also used the specific surface area by alkali titration described by Iler in U.S. Patent No. 2,727,008. In this method, which we prefer, the specific surface area is found by measuring the amount of alkali needed to adjust the pH of the sol from 4.0 to 9.0, then applying the equation $S_t = 32.0\ V - 28$ where $S_t$ is the specific surface area ($M^2/g$.) and V is the volume of 0.1 normal NaOH needed to adjust the pH from 4 to 9.

The particle size is then found by substituting the value for the specific surface area in the equation. $D_s = 3100/S_t$ = the particle size in m$\mu$. We found this method to work well and give consistent results but the results must not be considered absolute.

The relative viscosity of a silica sol is usually determined at a pH of 10 and at either 5 or 10% of silica. Theoretically a dispersion of uniform dense spheres at a concentration of 10% by weight has a relative viscosity of 1.14. Sols produced by our process have viscosity values close to this theoretical figure, indicating that they are nearly uniform spheroidal particles. The relative viscosity is measured in an Ostwald viscometer at $25 \pm 0.1°$ C. with distilled water as the standard.

The determiniation of the conductivity of the sol indicates the free ion content or salt content of the sol. It is generally considered that a silica sol above 40% $SiO_2$ must have a specific conductivity less than about $4 \times 10^{-4}$ mho/cm. at 10% $SiO_2$ and that it certainly should not exceed $1 \times 10^{-3}$ mho/cm. For concentrations above 45% $SiO_2$, it is considered that the specific conductance should not exceed about $6 \times 10^{-5}$ mho/cm. Sols prepared by our process have a relatively low conductivity, indicating the very low alkali content necessary for stabilization. It is, however, surprisingly much greater than the maximum conductivity previously considered permissible for sols of high concentration, that is in the range of 50% $SiO_2$.

The following table compares representative sols A1 and A2 produced by our process, and commercial sols B1 and B2 sold by two of the foremost producers using processes with which our process competes economically. It is to be noted that in all three ratio comparisons our products are twice as high, or higher, even though the percent $SiO_2$ and the pH are in the same relative range. It is much easier to make a sol with low occluded sodium values when the particle size is low, e.g. below 10 m$\mu$.

TABLE OF COMPARATIVE SOL PROPERTIES

| | $SiO_2/Na_2O$ | | | Percent $SiO_2$ | pH | Particle size, m$\mu$ | | Relative visc. | Conductivity $\times 10^{-4}$ ohm/cm. |
|---|---|---|---|---|---|---|---|---|---|
| | Titration | Flame | Cation exchange | | | Light scatter. | Titration | | |
| Our sol: | | | | | | | | | |
| A1 | 467 | 272 | 1,400 | 50 | 8.8 | 29 | 28 | 1.16 | 6.8 |
| A2 | 345 | 247 | 1,399 | 28 | 9.2 | 31 | 25 | 1.15 | 10.7 |
| Commercial sols: | | | | | | | | | |
| B1 | 175 | 121 | 700 | 45 | 9.0 | 22 | 21 | 1.23 | 12.2 |
| B2 | 90 | 78 | 612 | 30 | 9.8 | 12 | 13 | 1.28 | 13.7 |

It is also to be noted that even with high $SiO_2/Na_2O$ ratios the conductivity of our sols may be in the same range as the commercial sols which again indicates that a preponderant proportion of the alkali ions may be readily removed from our sols by base exchange processes. The relative viscosity figures show that our products tend to be regular spheres whereas other commercial sols are much more irregular. This is in spite of the higher particle size of our products.

EXAMPLES

The following examples are given for the purpose of illustrating the invention and include the best mode contemplated by the inventors for carrying out their invention. They are not to be construed as limiting the invention which is defined in the claims.

Example 1

In carrying out these examples, the acid nascent sol may be prepared by normal methods using the cation-exchange resin in the hydrogen form. We have used Amberlite IR-120 from Rohm & Haas Co. and Duolite C-25 from Diamond Alkali Chemical Co. as representative resins. Diluted sodium silicate having a ratio of about 3.2 $SiO_2/Na_2O$ is used in the normal fashion forming an acid nascent sol with a pH of about 3 which is stable at ordinary temperatures for about 5 hours and may be stable for as much as 2 days if held at low temperatures of 4 to 5° C. The silica recovery is generally about 94% of that originally present in the silicate solution. Either a batch process in which the resin is slurried with the silica sol to produce an acid sol containing about 5.5% $SiO_2$ or the column process in which the dilute silicate is passed through a column of resin with the eduction of an acid nascent sol having a pH of about 3.2 and containing about 3% $SiO_2$ may be employed.

Example 2

An alternative method of forming the acid nascent sol is that of alkali precipitation in which a dilute solution of sodium silicate, having for instance a ratio of 3.2 $SiO_2$ to 1 $Na_2O$, is added dropwise to a solution of oxalic acid. A crystalline precipitate of sodium binoxalate monohydrate, $NaHC_2O_4$—$H_2O$, is formed with crystals which precipitate out and are readily separated from the nascent sol. The solubility may be reduced by the addition of alcohol. This is a rather unique case. As is well known, there are very few insoluble sodium salts and even fewer which may be formed with reasonably inexpensive precipitants. For instance, sodium silicofluoride is fairly insoluble. However, if an attempt is made to precipitate the sodium silicofluoride by adding the alkali silicate solution to a fluosilicic acid, the sodium fluosilicate fails to precipitate and a gel forms instead. This is also true if an attempt is made to add the acid to the sodium silicate solution. Even the use of ammonium oxalate added to dilute sodium silicate solutions results in a gel.

The solubility of oxalic acid in water is rather low but may be increased by increasing the temperature. However, at higher temperatures sodium binoxalate monohydrate precipitate carries out excessive amounts of silica and gelation is more difficult to prevent. We have found that a much more satisfactory practice is to add the dilute sodium silicate to a saturated solution of oxalic acid at about room temperature and to add more solid crystals of oxalic acid to the mixture to replace the oxalate removed by the precipitation. In this manner an acid nascent sol can be prepared with a silica content as high as that of the silicate solution from which it is made and nascent sols containing 15% silica are readily prepared. In general, the pH is controlled between 0.5 and 1.5 for best results and the mixture is vigorously agitated.

In this example an acid nascent sol was formed using the precipitation of the sodium salt. 200 parts by volume of 2 N oxalic acid solution was vigorously agitated in a container and to this was added 60 parts by volume of a sodium silicate solution (having a ratio of 3.22 $SiO_2$ to $Na_2O$ by weight and 8.6% of $Na_2O$) which was added slowly to the oxalic acid solution increasing the pH to 1.35. In this process a white crystalline precipitate formed. Then 10 parts by weight of solid oxalic acid crystals were added in 1 portion to the solution reducing the pH again to 0.65, and a further 25 ml. of the sodium silicate solution was added slowly bringing the pH back to 1.35. This series of steps was continued until a total of 100 parts by weight of solid oxalic acid crystals had been added to the mixture. When precipitation was complete, the crystals were filtered from the liquid acid nascent sol at a pH between 0.5 and 1.5. The nascent sol contained 15% $SiO_2$ and was stable at room temperature for at least 3 hours.

To this nascent sol was added an equal weight of isopropanol whereupon a further precipitation of sodium binoxalate monohydrate occurred and this was increased by cooling the sol to 5° C. and holding it at that temperature for at least 2 hours. The second precipitate was first separated by centrifuging the nascent sol and then the solid was removed by a filter leaving clear filtrate containing about 7.5% of $SiO_2$, 50% of isopropyl alcohol and having a pH of 1.8. In order to reduce the anion content, this acid nascent sol was treated with anion exchange resin in hydroxyl form which removed most of the binoxalate ion and raised the pH to 3.8. This sol was stable for several days at 5° C. Such a sol may have a particle diameter of about 7 mu or less.

In the following examples a standard equipment arrangement was found adaptable. A reactor vessel with four (4) top openings was used with a mechanical stirrer in one, in two others were reflux condensers through which acid nascent sol and dilute alkaline solution respectively were delivered, and the fourth was used as a sampling port or to remove excess sol in constant volume operation. The solutions were delivered through the condensers and the product removed from the sampling port by pumps designed for accurate flow control. The acid nascent sol was directed by the reflux condenser to fall into the conversion solution without any contact with hot surfaces. The conversion solution was maintained at boiling under atmospheric conditions by heat applied evenly over the bottom of the reactor.

Example 3

Using the equipment described above, about 6000 parts by volume (p.b.v.) of acid nascent sol was converted in a "self-quench" procedure at a pH controlled at 9.6–9.8 with dilute alkali added at a constant rate. In this example 700 p.b.v. of water plus 20 p.b.v. of dilute N sodium silicate (0.1 N NaOH and 1.00% $SiO_2$) was used as the base alkaline solution in the reactor and was heated to 99–100° C. An additional 833 p.b.v. of this alkaline solution was added at a rate of 3 p.b.v. per minute throughout the conversion. The first 2000 p.b.v. of acid nascent sol was added at a rate of 14.8 p.b.v. per minute, the next 2000 p.b.v. of acid nascent sol was added at 22 p.b.v. per minute, and the last 2139 p.b.v. was added at a rate of 30.4 p.b.v. per minute. The addition required 292 minutes.

The product of the conversion and stabilization contained 5.06% $SiO_2$ representing 99.8% recovery, and had a volumetric $SiO_2/Na_2O$ ratio of 158, a spectrophotometric ratio of 136, an average particle size of 22.5 mu and a pH of 9.79.

On concentration at atmospheric pressure to 44.2% $SiO_2$ the average particle size was found to be 22 m$\mu$ with the pH at 9.6. The volumetric ratio had increased to 177 while the spectrographic ratio remained about the same at 138. Light scattering reached a maximum at about 5.5% $SiO_2$ and fell off rapidly to about 50% of the maximum at 44% $SiO_2$.

Example 4

In the following example our so-called "acid quench" conversion is described. 700 p.b.v. of water were placed in the reactor. To this initial charge of water was added 20 p.b.v. of dilute sodium silicate having the concentration of 0.1009 N NaOH and 1.00% $SiO_2$. This mixture had a pH of 10.0 measured at room temperature in a sample removed through the sampling port and cooled to room temperature in an ice bath.

Then the simultaneous addition of acid nascent sol and alkali was begun with the alkali added at a rate of 2 p.b.v. per minute while the acid nascent sol was added at a rate to maintain the pH at 9.6 to 9.8. The pH was determined as described above. For the first 6000 p.b.v. of acid nascent sol the alkali rate of addition was 2.1 p.b.v. per minute, while the acid nascent sol rate started at about 13 p.b.v. per minute and increased slowly to 20 p.b.v. per minute. Samples for particle size determination and analysis were taken at regular intervals.

After the addition of 6000 p.b.v. of acid nascent sol, the rate of addition of the acid nascent sol was increased so that the pH slid from 9.7 to 9.2 during the addition of 2000 p.b.v. more of acid nascent sol added at an average rate of about 45 p.b.v. per minute. When the pH had dropped to 9.2 the addition of dilute alkali solution was resumed again at an average of about 2 p.b.v. per minute and the acid nascent sol rate was adjusted to maintain the pH between 9.1 and 9.3. The rate required was about 35 to 50 p.b.v. per minute. When the addition of the acid nascent sol had been completed, the sol was removed from the container and allowed to cool and was then concentrated to 50% SiO₂ at atmospheric pressure. The 50% SiO₂ sol was stable for at least several months.

After the addition of 6000 p.b.v. of acid nascent sol, the pH was 9.7 and the silica content was 4.9%. The $SiO_2/Na_2O$ ratio determined volumetrically by titration was 157 and the particle size determined by light scattering was 21 m$\mu$. After the addition of the acid nascent sol had been completed, the pH was 9.20, the silica content was 5.17% and the flame spectrophotometric ratio $SiO_2/Na_2O$ was 224. The particle size was 27 m$\mu$.

The final concentrated sol had a pH of 8.75 and contained 50.2% of SiO₂, with particles having an average diameter of 28 m$\mu$. The $SiO_2/Na_2O$ ratio was determined as before volumetrically as 386 and spectrophotometrically as 228.

Example 5

The converse preparation of a sol with the use of an "alkali-quench" is exemplified by one in which the pH of the conversion solution was increased from 9.2 to 10.2. The particle size of the colloidal silica increased as the conversion proceeded, with the final product having a diameter of 25 m$\mu$. Since the pH of the final product was near 10, the silica to alkali ratio determined by volumetric analysis was about 64.

More in detail, in this process 700 p.b.v. of water were weighed into the reactor described above and the water was made alkaline by the addition of 10 p.b.v. of 0.1229 N NaOH. The mixture was heated to boiling and the acid nascent sol and additional dilute NaOH were added simultaneously with the NaOH first added at a rate of 2.3 p.b.v. per minute until the first 2000 p.b.v. of acid nascent sol had been added. After the addition of 700 p.b.v. of acid nascent sol the pH was 9.5 and the average particle size was 6.5 while the ratio of SiO₂ to Na₂O by volumetric titration was 92. The silica content was 2.7%. After 1400 p.b.v. of acid nascent sol had been added, the silica content had been raised to 3.6% with a volumetric ratio of 119. The pH was 9.2 and the average particle size was 12.5. At 2,000 p.b.v. of acid nascent sol, the rate of addition of NaOH was increased to about 9 p.b.v. per minute and the rate of acid nascent sol reduced so that by the time 2100 p.b.v. of acid nascent sol had been added the pH was 9.7, the average particle size was 16.5, the SiO₂ content was 3.95% and the ratio was 107. By the time 4000 p.b.v. of acid nascent sol had been added, the conversion sol contained 4.1% of SiO₂ with a ratio of 68, a pH of 10.2, and an average particle size of 21.5 m$\mu$. The rate of addition of acid nascent sol was increased to maintain the pH constant and was about 45 p.b.v. per minute. After 6000 p.b.v. of acid nascent sol had been added, there was 4.25% of SiO₂ present, the volumetric ratio was 70, and the spectrophotometric ratio was 80, the pH was still 10.2, and average particle size had increased to 25 m$\mu$.

Example 6

In this example the sampling port was equipped with a tube extending below the level of the alkalized or conversion sol and through the tube converted sol was withdrawn from the container at a rate which compensated for the simultaneous addition of the raw materials; that is, the dilute alkali solution and the acid nascent sol. Alkali was added at about 1.5 p.b.v. per minute while the acid nascent sol maintained the pH at about 9.2. This required the addition of about 20 p.b.v. per minute. This rate of addition could be maintained approximately constant instead of increasing, as in Example 4. The sol withdrawn from the conversion flask was concentrated at atmospheric pressure and constant volume.

More specifically, in this example 700 p.b.v. of water was placed in the conversion container with 20 parts by volume of a solution containing 3% N sodium silicate (3.22 $SiO_2/Na_2O$ and 8.9% Na₂O). This solution had a pH of 10.0 and was heated to the boiling point.

Additional alkali solution was added at 2 p.b.v. per minute, and acid nascent sol at 13 p.b.v. per minute, but the addition of the acid nascent sol was varied from about 13 to 21 p.b.v./minute in order maintain the pH at 9.7.

After 6000 p.b.v. of acid nascent sol had been added at a constant pH of 9.7 ±0.1 the silica content was 4.64%. The ratio of SiO₂ to Na₂O by volumetric titration was 172, and the particle size was 20.5 m$\mu$. The rate of addition of acid nascent sol was 30 p.b.v. per minute.

At this point the addition of alkali was halted until the pH had dropped to 9.3 and the pH was then maintained at 9.2 ±0.1 by varying the acid nascent sol addition as before. After 10,000 p.b.v. of acid nascent sol had been added the pH was 9.3 and the silica content was 5.09%. The volumetric ratio was 339 $SiO_2/Na_2O$ with a particle size of 25.5 m$\mu$. The acid nascent sol rate of addition was 31.0 p.b.v. per minute.

After 15,400 p.b.v. of acid nascent sol had been added, the pH was 9.2 and the silica content was 4.98%; the $SiO_2/Na_2O$ ratio by volumetric titration was 415 and by flame spectrophotometry it was 262; the particle size was 29 m$\mu$. At this point 12,400 p.b.v. of the converted sol was removed and concentration was started at atmospheric conditions. At the same time the tube was inserted in the sampling port and sol was removed from the conversion container at a rate to maintain the volume constant and to maintain a continuous reaction. The sol removed from the conversion container was directed into the concentrating vat.

Acid nascent sol was added to the reaction at about 20 p.b.v. per minute to maintain the p.b.v. at about 9.2 while the alkaline solution was added at about 1.4 p.b.v. per minute.

Under these conditions after 18,400 p.b.v. of acid nascent sol had been added the conversion sol had a pH of 9.2 with 5.26% of SiO₂. The ratio by volumetric titration was 351 and the particle size was 32 m$\mu$. The addition of acid nascent sol was continued at a rate of about 20 p.b.v. per minute. After the addition of 31,200 p.b.v. of acid nascent sol the pH was 9.2 and the silica content of the conversion sol was 5.25; the ratio was 228 by volumetric titration and 219 by flame spectrophotometry. The particle size was 32 m$\mu$.

The remaining sol was concentrated to 28.3% of SiO₂ but the concentration process could have been continued to at least 50% if desired. The $SiO_2/Na_2O$ ratio of the concentrated solution by volumetric titration was 345, by flame spectrophotometer 236, and after cation exchange 1399. The pH was 9.15 and the particle size was 33 m$\mu$. The relative viscosity at 10% SiO₂ was 1.15. The light scattering reached a maximum at about 4% SiO₂ and dropped sharply to about 50% of the maximum at about 20% SiO₂.

Example 7

In this example the conversion polymerization and concentration were carried out in a single container; that is in the reactor vessel described. After 10,000 p.b.v. of acid nascent sol had been added and the desired particle size of 24.5 m$\mu$ attained, the sol was permitted to evaporate water at atmospheric pressure and acid nascent sol was added to maintain the volume while alkali was added as required to maintain the pH at 9.2. This was continued until the concentration had reached 50% SiO₂ at which time the particle size was about 40 m$\mu$. From this point finished sol was removed as in Example 4 by a sampling tube which drained off sol at a rate to maintain the 50% SiO₂ concentration and the constant volume in the conversion vessel. This finished sol had a pH of 9.2 with 50% SiO₂ and a particle size above 40 m$\mu$ and a flame spectrophotometric ratio of about 300 $SiO_2/Na_2O$. Such a sol treated with base exchange resin to remove the alkali ion had a ratio of above 1000.

Uses

The silica sols formed by these procedures are especially useful as binders for refractory cements where low alkali content is required and as the raw material for the production of organic ammonium silicates which are also essentially free of alkali metal ions. They are, of course, useful for many well-known uses for silica sols.

Thus we have invented a new and more economical process for producing from solutions of soluble silicates, highly concentrated silica sols with unexpectedly low concentrations of occluded alkali ions and a high concentration of large spherical particles having the average diameter. We have defined and controlled the factors effecting polymerization of the silica without gelation.

The invention is the process lies in part in controlling the size and size-range of the dense silica particles in the final sol by careful close control of the pH of conversion and concentration within ±0.2 pH units and may include the shift of the pH up or down as required by the final product. The preferred inventive process includes initial conversion at a pH of about 9.7 with a later shift to pH of 9.2 wherein the particle size is determined by carrying out the initial phase of the conversion at about pH 9.7 and developing a high $SiO_2/Na_2O$ ratio by continuing the conversion at about pH 9.2. Further there is invention in obtaining stable, dense, concentrated silica sols from aqueous nascent sols without the necessity of heel formation of alkalization at ambient temperatures and further there is invention in concentration of the sol at a constant pH which inhibits further particle growth under the conditions used. Furthermore, there is the novel invention of forming a nascent silica sol by the precipitation of sodium oxalate using the addition of solid oxalic acid.

The preferred product of our invention has a silica content above about 40%, flame photometric ratios greater than about 250 $SiO_2/Na_2O$, a particle size greater than about 20 m$\mu$, pH between about 8.5 and 9.5, and a ratio after treatment with cation exchange resins greater than 1000 $SiO_2/Na_2O$. The relative viscosity at 10% $SiO_2$ and a pH of 10 is below 1.2, and the conductivity under the same conditions is approximately $10 \times 10^{-4}$.

What we claim is:

1. A continuous process for making from aqueous alkali silicate solutions stable aqueous sols of silica having above 40% $SiO_2$, a pH 8.5 to 9.5, dense particles of 15 to 40 m$\mu$ diameter with a high concentration of particles near the average size range, a relative viscosity at 10% $SiO_2$ below 1.2, and a conductivity at 10% $SiO_2$, pH 10, 28° C. of between $7 \times 10^{-4}$ and $15 \times 10^{-4}$ ohms/cm., an $SiO_2/Na_2O$ ratio by flame spectrophotometry of above 250 and above 1000 after cation exchange, while avoiding the formation of a heel consisting essentially of (a) preparing an aqueous acid nascent sol from an aqueous soluble silicate solution;
(b) preparing a solution of dilute aqueous alkali containing no silica sol having a pH of between about 8.5 and 11;
(c) simultaneously alkalizing and polymerizing said acid nascent sol by adding said acid nascent sol to said solution of dilute alkali heated to a temperature between about 80 and 100° C. simultaneously with additional solution of dilute alkali at rates which control the pH at a selected level in the range of 10 to 9.2 within a variation of ±0.2 pH units to control the particle size between about 20 and 40 m$\mu$;
(d) maintaining the said solution of dilute alkali to which the acid nascent sol is added at a temperature of between about 80 and 100° C.;
(e) concentrating the alkalized and polymerized sol to a concentration between 40 and 55% $SiO_2$.

2. The process of claim 1 in which the alkalizing, polymerizing and concentrating of the sol is carried out at constant volume.

3. The process of claim 1 in which in step (c) the pH is first controlled at between about 9.6 and 9.9 and is then slid down to a controlled pH between about 9.1 and 9.4.

4. The process of claim 1 in which in step (c) the pH is first controlled at between about 9.1 and 9.5 and is then slid up to a controlled pH between about 9.6 and 10.0.

5. The process of claim 1 in which the alkalization and polymerization is carried out in a reactor in which the alkalized and polymerized sol of step (e) is removed continuously from the reactor while maintaining a constant volume therein by simultaneously alkalizing and polymerizing additional acid nascent sol.

6. The process of claim 1 in which all steps are carried out in a single reactor with finished sol removed at a rate to maintain a constant volume in the reactor.

7. The process of claim 1 in which the acid sol is prepared by precipitation of sodium binoxalate.

References Cited

UNITED STATES PATENTS

| | | | |
|---|---|---|---|
| 2,577,484 | 12/1951 | Rule | 252—313 |
| 2,605,228 | 7/1952 | Alexander et al. | 252—313 |
| 2,663,614 | 12/1953 | Haag | 252—313 X |
| 2,856,302 | 10/1958 | Reuter | 252—313 X |
| 2,929,790 | 3/1960 | Reuter et al. | 252—313 |

RICHARD D. LOVERING, *Primary Examiner.*

U.S. Cl. X.R.

252—309, 317